United States Patent
Halwan et al.

(10) Patent No.: US 6,983,617 B2
(45) Date of Patent: Jan. 10, 2006

(54) EFFICIENT CONTROL FOR SMOOTHLY AND RAPIDLY STARTING UP AN ABSORPTION SOLUTION SYSTEM

(75) Inventors: Vivek Halwan, Wethersfield, CT (US); Mark E. Marler, Glastonbury, CT (US)

(73) Assignee: UTC Power, LLC, South Windsor, CT (US)

( * ) Notice: Subject to any disclaimer, the term of this patent is extended or adjusted under 35 U.S.C. 154(b) by 24 days.

(21) Appl. No.: 10/749,193

(22) Filed: Dec. 31, 2003

(65) Prior Publication Data

US 2005/0138938 A1 Jun. 30, 2005

(51) Int. Cl.
*F25B 33/00* (2006.01)
*F25B 15/00* (2006.01)

(52) U.S. Cl. .......................................... 62/148; 62/497
(58) Field of Classification Search .................. 62/141, 62/142, 148, 126, 497
See application file for complete search history.

(56) References Cited

U.S. PATENT DOCUMENTS

| 4,665,709 A | * | 5/1987 | Perry ........................... 62/141 |
| 5,477,696 A | | 12/1995 | Takahata |
| 5,619,859 A | * | 4/1997 | Takigawa et al. ............. 62/148 |

FOREIGN PATENT DOCUMENTS

| JP | 05248726 A | * | 9/1993 |
| JP | 10-300263 | | 11/1998 |
| JP | 2002-13834 A | | 1/2002 |

* cited by examiner

*Primary Examiner*—Chen Wen Jiang
(74) *Attorney, Agent, or Firm*—Carlson, Gaskey & Olds

(57) ABSTRACT

An absorption chiller system has an efficient start-up control that monitors system condition, and in particular the absorption solution temperature. The system limits the amount of heat delivered into the absorption chiller generator, to provide a gradual rise in the absorption solution temperature at start-up. In this manner, undesirable noise vibration and rapid thermal expansion, which may have occurred in the past is reduced or eliminated.

19 Claims, 4 Drawing Sheets

EFFICIENT CONTROL FOR SMOOTHLY AND RAPIDLY STARTING UP AN ABSORPTION SOLUTION SYSTEM

BACKGROUND OF THE INVENTION

This invention relates to a control that utilizes the absorption solution temperature as feedback for controlling the amount of heat delivered into an absorption chiller at start-up.

Absorption solution/refrigerant systems are utilized in many applications to provide chilled or heated water for environmental control in buildings, etc. In a basic system, an absorber separately receives a flow of an absorption solution (concentrated LiBr), and a refrigerant. The refrigerant is often water. The refrigerant is directed onto a tube, which would carry water to be chilled for part of a building air conditioning system. The absorption solution is also directed into the absorber and is cooled. Within the absorber, the absorption solution and the liquid refrigerant combine. The absorption solution, at this point, is at the proper temperature and concentration that enables it to absorb the refrigerant vapor. It will then carry this refrigerant with it as it is returned to a generator.

In the generator, a heat source is applied to the mixed absorption solution and refrigerant, which boils off a portion of the refrigerant. This warmer refrigerant vapor is passed through a condenser where it is cooled and changed into liquid refrigerant. The liquid refrigerant is then sent to the evaporator where it cools the tubes carrying water for building air conditioning. The refrigerant evaporates and changes into vapor. This vapor is allowed to flow into the absorber unit. Here the water vapor is absorbed into the absorption solution being returned from the generator Notably, an absorption chiller is utilized to provide chilled water for use in an air conditioning system. The same system can be utilized to provide heated water, with some rearrangement of flow, etc. For purposes of this application, the invention extends to both heating and cooling systems utilizing an absorption solution. While the application describes an "absorption chiller," the invention extends to absorption solution/refrigerant systems that can be utilized to either chill or heat water. A worker of ordinary skill in the art would recognize how the disclosed system would be modified to function as an absorption heater.

At start-up, it would be desirable not to immediately subject the generator to the full heat of the system under some conditions. If the heat is directed into the chiller immediately, there is undesirable vibration, and noise, due to vapor being mixed with solution in the heat exchanger pipes, and rapid thermal expansion. These effects can reduce product life and also cause undesirable noise. The example above is for startup conditions but those skilled in the art would appreciate that a similar problem could occur under any conditions where a large change in supply heat is applied to the chiller.

In the prior art, some fixed ramp over time is utilized to control the amount of heat delivered into the chiller system. This is not as efficient as would be desirable, as a fixed ramp does not change with the current system conditions.

When driving the system with exhaust heat from a co-generation application, the rate of heat flow should be regulated by the response of the chiller. There is a maximum temperature rise rate for the chiller that is a function of its capacity and design. If too much heat is being applied to the chiller it will exceed this rate and will have the undesirable effects described above. Conversely, if the chiller is heated at a very slow rate, the chiller will not be able to get up to full operating capacity in a reasonable amount of time.

This invention is the control approach which is used to quickly bring the chiller up to full capacity while managing the temperature rises in the solutions to preventing the undesirable effects of uncontrolled rapid heat-up rates

SUMMARY OF THE INVENTION

In a disclosed embodiment of this invention, system feedback is utilized to control the amount of heat delivered into the generator for an absorption chiller at start-up. In a preferred embodiment, the feedback is taken from the temperature of the solution leaving the generator. Thus, the amount of heat delivered into the system is controlled to reach a steady state as soon as possible, without risking undesirable rapid thermal expansion, vibration, noise, or other undesirable results.

In one preferred embodiment, the solution temperature is compared at two closely spaced time periods. If the difference between the two temperatures exceeds a first threshold, then some limit on the heat entering the system is maintained. As an example, a damper valve controlling the flow of heat into the system may be kept partially closed if the change in solution temperature exceeds this first threshold. If the change in solution temperature does not exceed the threshold, but is still greater than some lesser second threshold, the start-up mode would continue.

At some point, the change in the two temperatures is less than both thresholds. At that point, all limits on the amount of opening of the damper valve are removed. In this manner, the control of the heat entering the system is maintained until the change in temperature of the solution is below a predetermined amount. In this manner, full heat being delivered into the generator will not occur until the solution has generally reached the desired state condition.

A second embodiment is particularly useful for a system that has the ability to provide "step" heating. As an example, in a preferred embodiment, a system for providing the heat includes several micro-turbines, and the outlet of the micro-turbines is utilized as a heating fluid to be delivered into the generator. The control of damper valve opening is changed dependent upon how many micro-turbines are operational or on how much heat and flow is being generated by them. As an example, if less than all of the micro-turbines are being utilized, perhaps no damper limit will be put in place. On the other hand, when the micro-turbines are all being utilized, some control on the amount of damper valve opening will be maintained until the solution temperature reaches a predetermined amount.

While the present invention is most directed to a start-up mode wherein the system is starting, many of the benefits and goals would have equal application to any point wherein the temperature of the system is to increase rapidly from a lower temperature to a higher temperature. Thus, the invention is not limited to simply a start-up mode, but would also extend to a temperature increase mode.

These and other features of the present invention can be best understood from the following specification and drawings, the following of which is a brief description.

DETAILED DESCRIPTION OF THE PREFERRED EMBODIMENT

Figure 1:
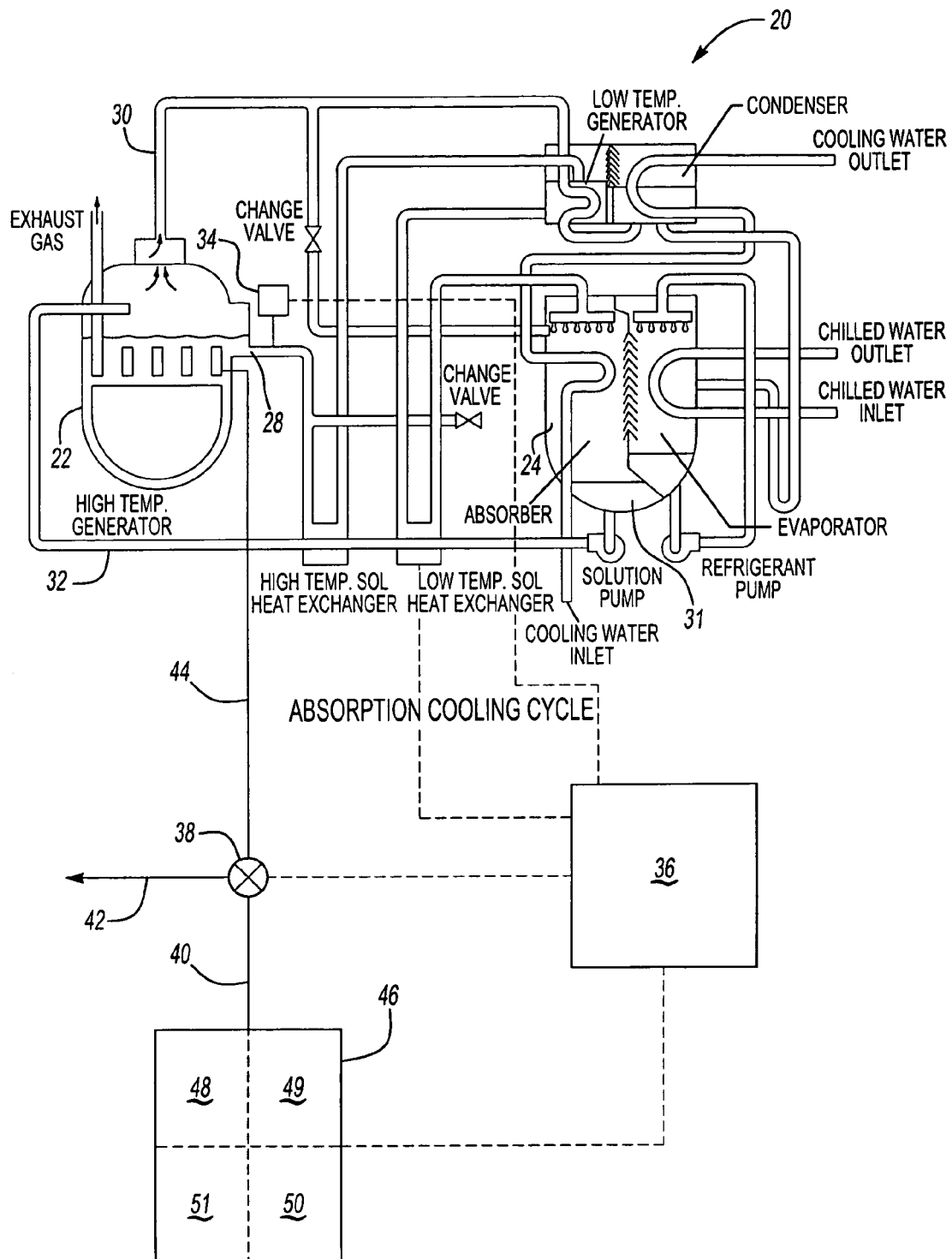
FIG. 1 is a schematic view of a system incorporating the present invention.

An absorption chiller system 20 is illustrated in FIG. 1. As shown, an evaporator 24 receives flow from a refrigerant line 30. Refrigerant in line 30 is delivered through an outlet to drip or fall on a water tube. In the event that the system 20 is a chiller, the tube will carry water that is to be cooled, and then utilized to cool environmental air in a building. Alternatively, as mentioned above, the water could be heated, with the refrigerant leaving the outlet being a heated refrigerant. Again, the details of the change to provide this function are within the skill of a worker in this art.

A second line 28 delivers an absorption solution into the absorber, positioned next to the evaporator 24. Ultimately, a mixture of the refrigerant and absorption solution, or diluted LiBr solution, gathers at 30, and is returned through a line 32 to a generator 22. A source of heat is delivered through a line 44 into the generator 22. This source of heat boils refrigerant out of the mixture, and into line 30. A second line delivers the remaining concentrated absorption solution, with lower levels of refrigerant, through a line 28, returning to the absorber or evaporator 24. This concentrated absorption solution in the line 28 is cooled on the path to the absorber, increasing its ability to absorb the water vapor that is created as the refrigerant evaporates in the "Evaporator"

The present invention relates to control of the amount of heat delivered into the system at start-up. As shown, a sensor 34 may sense the temperature of the solution on line 28. While a preferred location is shown, it should be understood that other locations that sense a temperature of the solution would come within the scope of this invention. Sensor 34 communicates temperature information to a control 36. Control 36 controls a diverter valve 38 for diverting a heating fluid source, line 40, either to an exhaust dump 42, or into a line 44 leading into the generator at 22. The diverter valve 38 may be generally as disclosed in co-pending provisional patent application Ser. No. 60/501,366, and entitled "Diverter Valve For Capacity Control Of A Refrigerant Absorption Cycle During Heat Service." However, other valve systems for controlling the flow into the line 44 may also be utilized.

As shown, a source 46 of heating fluid provides the fluid to the line 40. In a preferred embodiment, the source 46 is a micro-turbine arrangement. The micro-turbine arrangement has four turbines 48, 49, 50, 51, shown schematically. A control 36 can separately control the source 46 such that one, two, three or all four of the turbines are operational. Alternatively, the number of operational turbines may be controlled by some other outside system and they can also be controlled to run at different output levels. That is, the purpose of the micro-turbines at source 46 may be completely removed from the system 20, and the exhaust from the micro-turbines (source 46) simply utilized as the heating fluid source into line 40. If the control of the turbines 48, 49, 50, and 51 is not driven by the control 36, then at least the number of turbines operational at any one point is preferably provided as feedback to the control 36.

While the capacity is specifically illustrated as being provided by a varying number of micro-turbines, other methods of limiting capacity would also come within the scope of this invention. As an example, the valve could be controlled under this algorithm by sensing the heat flow from the turbines, the power generated by them, etc.

The present invention broadly utilized a system variable to provide feedback of how much heat should be delivered to the generator 22 at start-up of the absorption chiller while still minimizing the risk of undesirable noise, vibration, rapid thermal growth, or other undesirable results. In a more preferred embodiment, the system feedback is the temperature of the solution.

Figure 2:
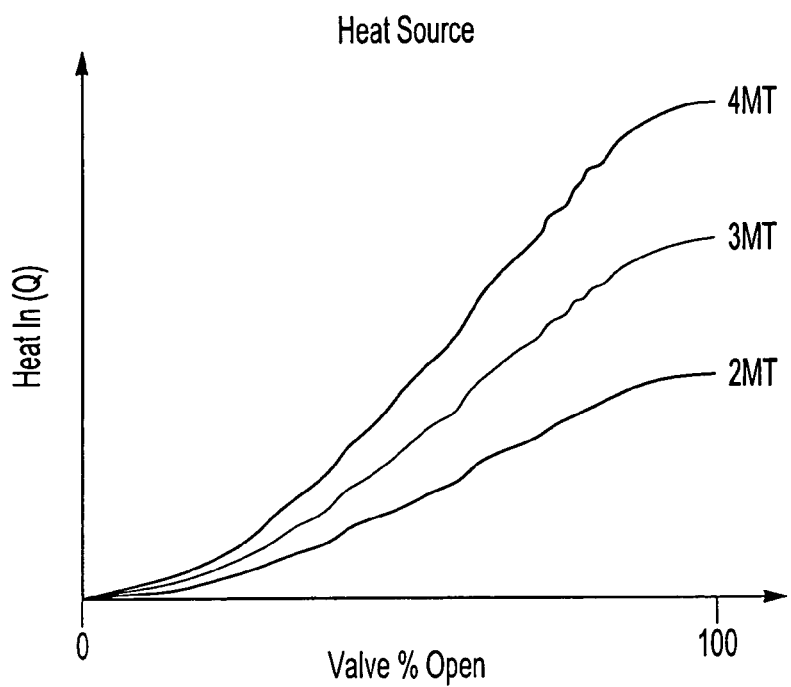
FIG. 2 shows plots of curves of heat into the system compared to the amount of valve openings.

Two different algorithms are disclosed for providing this start-up control. FIG. 2 shows a chart of the amount of heat delivered into the generator 22 as the percentage of opening of the valve 38 changes, and as the number of micro-turbines that are operational changes. As shown, a curve of some sort would result.

Also, the capacity of the turbines would also be lower simply if they were operating below their maximum output.

Figure 3:
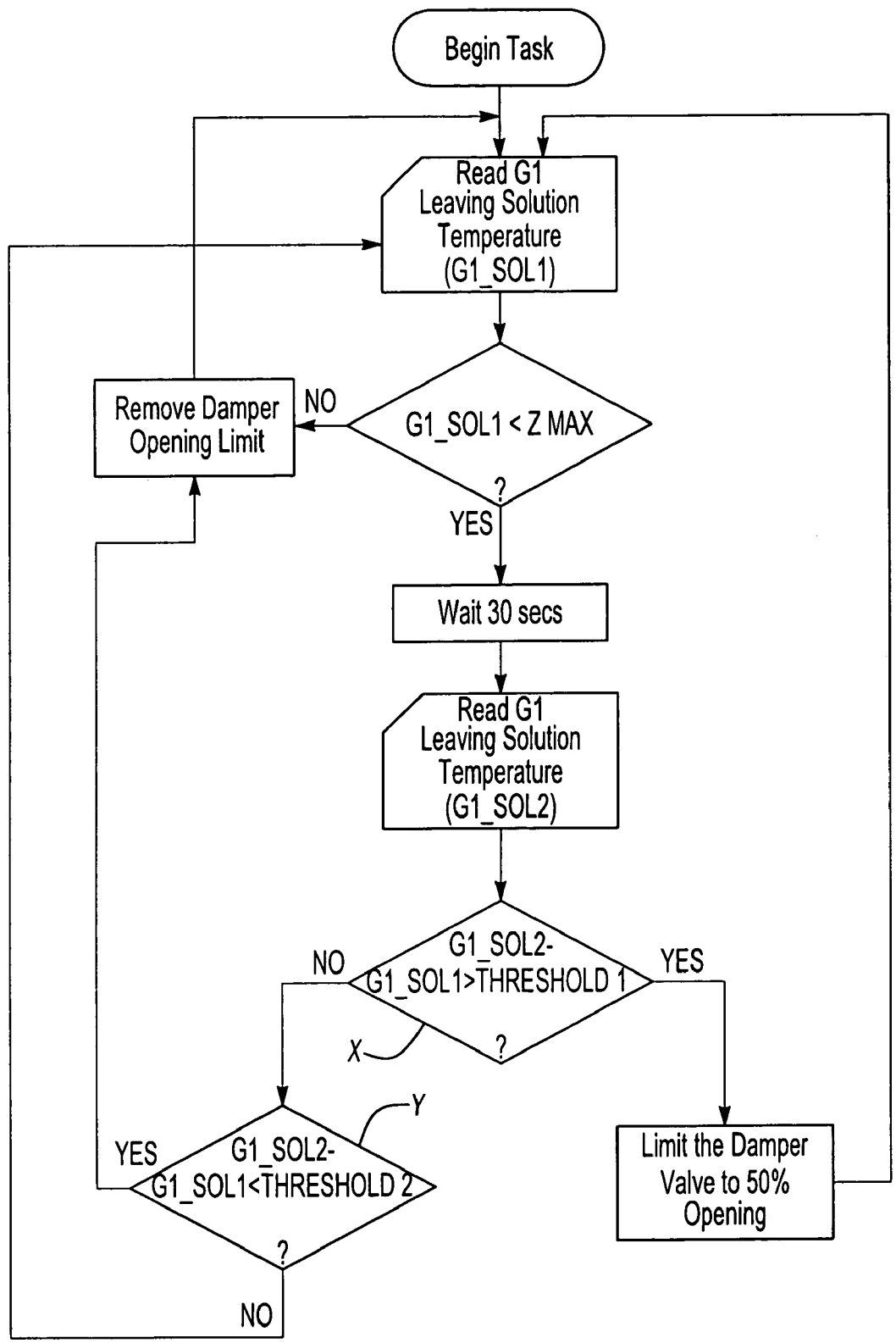
FIG. 3 is a flow chart for the FIG. 2 system.

FIG. 3 is a flow chart of a method that does not directly monitor the output of the micro-turbines. Instead, in the start-up mode, the change in the solution temperature over a short period of time is utilized to determine whether a start-up mode is still proper. If the chiller is in a start-up mode, the temperature of the solution at 34 is measured (G1_SOL1), and a second reading is taken a short period of time later (G1_SOL2). At box X, these two temperature readings are compared. If the rise in the solution temperature over the short period of time exceeds a first threshold, then the system continues to limit the maximum amount of damper valve opening. It should be understood, that during steady state operation, the valve opening is controlled dependent upon capacity or other system needs by the control 36. The present invention limits the maximum amount of valve opening to 50%. Of course, other valve opening amounts are within the scope of this invention, including both some other limit, and a series of incremental limits based upon, as an example, the amount of solution temperature rise.

In the event that the difference in solution temperature does not exceed the threshold, a box Y is considered. If the change is still above a certain amount, then the control stays in the same mode. This is to anticipate the fact that there might be variation in the amount of temperature rise, while the system is still in a start-up mode. However, if the change is also less than this second threshold at box Y, then all limits on the damper opening are removed. As is also clear, should the initial temperature reading be greater than a maximum (e.g., 212° F.), then the control moves immediately to remove any damper opening limit, recognizing that the start-up mode has passed.

Figure 4:
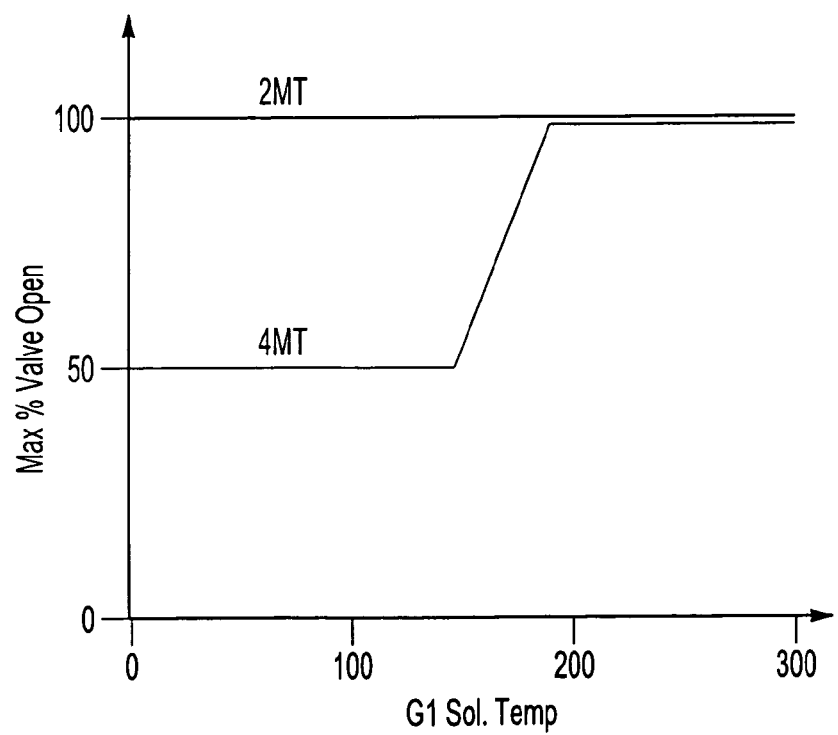
FIG. 4 shows a plot of the amount of valve opening and corresponding solution temperature for two distinct operational conditions.
Figure 5:
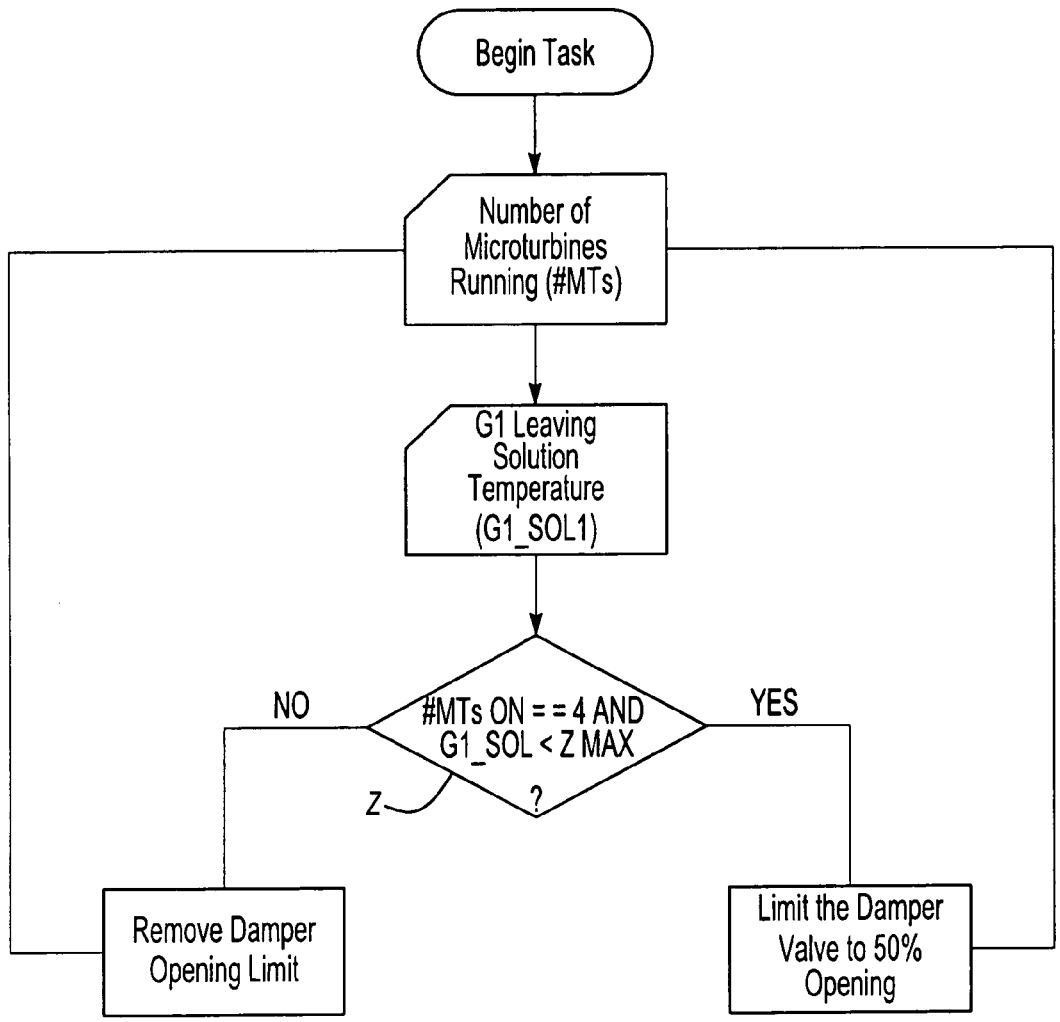
FIG. 5 is a flow chart of the FIG. 4 system.

FIG. 4 shows a graph of a second algorithm that is based upon the number of micro-turbines that are operational, or on the heat, power generated, etc. The control utilizes either a full micro-turbine operational mode that limits the valve opening, or perhaps have no limit on the valve opening during start-up mode if a fewer number of micro-turbines are operational. As shown in the flow chart of FIG. 5, the change in temperature is not necessary taken; instead the temperature is simply read. At box Z, this control asks whether all of the micro-turbines are on, and whether the solution temperature is below a predetermined amount. If the answer to either question is "no," then all limits on the damper opening are removed. If, however, the answer to both questions is "yes," then the damper limit is maintained.

Again, while the simple question of whether all of the micro-turbines are on is specifically disclosed in the application, similar controls come within the scope of the invention and may be provided by temperature sensors, mass flow sensors, power output levels, and other approaches. This capacity is then utilized to control the position of the valve.

This algorithm is perhaps sometimes more efficient than the FIG. 3 algorithm in that the chiller start-up time would be longer with the FIG. 3 flow chart in the event that fewer micro-turbines are operational.

While microturbines are disclosed as the source of heat, this invention would extend to many other sources. As examples, reciprocity piston engines, process heat, etc. could all be used.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. An absorption solution/refrigerant system comprising:
a generator for receiving a source of heat, and for receiving a solution including an absorption solution and a refrigerant, said generator utilizing said source of heat to boil a portion of said refrigerant out of said absorption solution;
a valve for controlling the amount of heat delivered into said generator, and a control for said valve, during start-up said control receiving feedback of a condition in said absorption solution/refrigerant system, and utilizing said feedback to control the amount of opening of said valve;
said feedback is the temperature of said absorption solution; and
said control receives feedback of an absorption solution temperature change over time, and limits an amount of opening of said valve based upon the magnitude of said absorption solution temperature change.

2. A system as set forth in claim 1, wherein said feedback is the temperature of said absorption solution.

3. A system as set forth in claim 2, wherein said temperature of said absorption solution is taken as said absorption solution leaves said generator and heads to an absorber, also within said absorption solution/refrigerant system.

4. A system as set forth in claim 1, wherein said control remains in start-up mode as long as said change over time in said absorption solution temperature exceeds a second predetermined amount.

5. A system as set forth in claim 1, wherein said control also receives feedback on the magnitude of available hear being delivered into said absorption chiller from said source of heat, and said control controlling said valve at least in part upon said feedback of said available amount of heat.

6. A system as set forth in claim 1, wherein said control determining that a start-up transient has stopped, and moving out of said start-up mode.

7. An absorption solution/refrigerant system comprising:
a generator for receiving a source of heat, and for receiving a solution including an absorption solution and a refrigerant, said generator utilizing said source of heat to boil a portion of said refrigerant out of said absorption solution;
a valve for controlling the amount of heat delivered into said generator, and a control for said valve, during start-up said control receiving feedback of a condition in said absorption solution/refrigerant system, and utilizing said feedback to control the amount of opening of said valve;
said control also receives feedback on the magnitude of available heat being delivered into said absorption chiller from said source of heat, and said control controlling said valve at least in part upon said feedback of said available amount of heat; and
said source of heat is a multiple micro-turbine system, and said control controls the maximum amount of valve opening based upon the number of micro-turbines operational at any one point.

8. An absorption chiller as set forth in claim 7, wherein said control stops any limit on the amount of opening of said valve at chiller start-up if less than some number of said micro-turbines are operational, and maintains said maximum amount of valve opening if some greater number of micro-turbines are operational.

9. A method of controlling an absorption solution/refrigerant system at start-up comprising:
(1) providing a generator for receiving a mixed absorption solution and refrigerant, and a source of heating fluid, said heating fluid boiling at least a portion of said refrigerant out of said mixed absorption solution and refrigerant, said generator communicating a boiled off refrigerant into an absorber, and communicating remaining absorption solution to said absorber, and providing a valve on said source of heat;
(2) providing feedback to a control of a condition within said absorption solution/refrigerant at start-up, and utilizing said feedback to control a maximum amount of opening of said valve at start-up to limit the amount of heat delivered into said generator, wherein said feedback is the temperature of said absorption solution, and a change in the solution temperature is taken over a period of time, and if said change exceeds a predetermined amount then a maximum limit on the amount of valve opening is maintained.

10. A method as set forth in claim 9, wherein said control determining that a start-up transient has been completed, and moving out of a start-up mode.

11. A method of controlling an absorption solution/refrigerant system at start-up comprising:
(1) providing a generator for receiving a mixed absorption solution and refrigerant, and a source of heating fluid, said heating fluid boiling at least a portion of said refrigerant out of said mixed absorption solution and refrigerant, said generator communicating a boiled off refrigerant into an absorber, and communicating remaining absorption solution to said absorber, and providing a valve on said source of heat;
(2) providing feedback to a control of a condition within said absorption solution/refrigerant at start-up, and utilizing said feedback to control a maximum amount of opening of said valve at start-up to limit the amount of heat delivered into said generator, and said source of heat includes a number of separate heat sources, and said control turns off any limit at start-up of said valve opening should the number of heat sources operational be less than a predetermined number, but maintains a limit on said valve opening should the number of heat sources which are operational exceed said predetermined number.

12. An absorption solution/refrigerant system comprising:
a generator for receiving a source of heat, and for receiving a solution including an absorption solution and a refrigerant, said generator utilizing said source of heat to boil a portion of said refrigerant out of said absorption solution;

a valve for controlling the amount of heat delivered into said generator, and a control for said valve, during an increasing temperature mode, said control receiving feedback of a condition in said absorption solution/refrigerant system, and utilizing said feedback to control the amount of opening of said valve; and said control receives feedback of an absorption solution temperature change over time, and limits an amount of opening of said valve based upon the magnitude of said absorption solution temperature change.

13. A system as set forth in claim 12, wherein said feedback is the temperature of said absorption solution.

14. A system as set forth in claim 12, wherein temperature of said absorption solution is taken as said absorption solution leaves said generator and heads to an absorber, also within said absorption solution/refrigerant system.

15. A system as set forth in claim 12, wherein said control remains in increase temperature mode as long as said change over time in said absorption solution temperature exceeds a second predetermined amount.

16. A system as set forth in claim 12, wherein said control also receives feedback on the magnitude of available heat being delivered into said absorption chiller from said source of heat, and said control controlling said valve at least in part upon said feedback of said available amount of heat.

17. A system as set forth in claim 12, wherein said control determining a start-up transient has been complete, and said control moving out of start-up mode at that time.

18. An absorption solution/refrigerant system comprising:

a generator for receiving a source of heat, and for receiving a solution including an absorption solution and a refrigerant, said generator utilizing said source of heat to boil a portion of said refrigerant out of said absorption solution;

a valve for controlling the amount of heat delivered into said generator, and a control for said valve, during an increasing temperature mode, said control receiving feedback of a condition in said absorption solution/refrigerant system, and utilizing said feedback to control the amount of opening of said valve; and said source of heat is a multiple micro-turbine system, and said control controls the maximum amount of valve opening based upon the number of micro-turbines operational at any one point.

19. An absorption solution/refrigerant system comprising:

a generator for receiving a source of heat, and for receiving a solution including an absorption solution and a refrigerant, said generator utilizing said source of heat to boil a portion of said refrigerant out of said absorption solution;

a valve for controlling the amount of heat delivered into said generator, and a control for said valve, during an increasing temperature mode, said control receiving feedback of a condition in said absorption solution/refrigerant system, and utilizing said feedback to control the amount of opening of said valve; and said control stops any limit on the amount of opening of said valve during temperature increase mode if less than some number of said micro-turbines are operational, and maintains said maximum amount or valve opening if some greater number of micro-turbines are operational.

* * * * *